US009424436B2

(12) United States Patent
Plumb

(10) Patent No.: US 9,424,436 B2
(45) Date of Patent: Aug. 23, 2016

(54) OVER NETWORK OPERATION RESTRICTION ENFORCEMENT

(71) Applicant: Microsoft Technology Licensing, LLC, Redmond, WA (US)

(72) Inventor: Graham Charles Plumb, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/529,067

(22) Filed: Oct. 30, 2014

(65) Prior Publication Data

US 2016/0125195 A1 May 5, 2016

(51) Int. Cl.

| | |
|---|---|
| ***H04L 29/06*** | (2006.01) |
| ***G06F 21/62*** | (2013.01) |
| ***H04L 9/08*** | (2006.01) |

(52) U.S. Cl.

CPC .......... *G06F 21/6218* (2013.01); *H04L 9/0872* (2013.01); *H04L 63/107* (2013.01)

(58) Field of Classification Search

CPC .. G06F 21/6218; H04L 63/107; H04L 9/0872

See application file for complete search history.

(56) References Cited

U.S. PATENT DOCUMENTS

| | | | | |
|---|---|---|---|---|
| 6,381,602 | B1 | 4/2002 | Shoroff et al. | |
| 7,092,943 | B2 | 8/2006 | Roese et al. | |
| 7,801,894 | B1 | 9/2010 | Bone et al. | |
| 7,809,800 | B2 | 10/2010 | Kim et al. | |
| 8,280,958 | B2 | 10/2012 | Chavez et al. | |
| 8,312,064 | B1 | 11/2012 | Gauvin | |
| 8,613,108 | B1 | 12/2013 | Aggarwal | |
| 8,656,454 | B2 | 2/2014 | Gunawardena et al. | |
| 8,805,956 | B1 * | 8/2014 | Yang | G06F 21/10 709/217 |
| 2002/0177449 | A1 * | 11/2002 | McDonnell | G06F 21/00 455/456.1 |
| 2006/0036875 | A1 * | 2/2006 | Karoubi | G06F 21/6263 713/191 |
| 2006/0117010 | A1 * | 6/2006 | Hakala | G06F 17/30165 |
| 2007/0250627 | A1 * | 10/2007 | May | G06F 21/56 709/225 |
| 2008/0281908 | A1 * | 11/2008 | McCanne | G06F 17/30156 709/203 |
| 2009/0271586 | A1 * | 10/2009 | Shaath | G06F 12/1466 711/163 |
| 2011/0247074 | A1 | 10/2011 | Manring et al. | |
| 2012/0078643 | A1 | 3/2012 | Nagpal et al. | |

(Continued)

FOREIGN PATENT DOCUMENTS

EP 0715243 6/1996

OTHER PUBLICATIONS

Perlman, Radia. "File system design with assured delete." Security in Storage Workshop, 2005. SISW'05. Third IEEE International. IEEE, 2005.*

(Continued)

*Primary Examiner* — Shawnchoy Rahman

(74) *Attorney, Agent, or Firm* — Nicholas Chen; Sade Fashokun; Micky Minhas

(57) ABSTRACT

The enforcement of operation restriction on a file system entity over a network. The file system entity exists on a server (which could be a single machine, a cluster of servers, or a cloud computing environment). The server facilitates setting up of a session over a network with a client. As part of this facilitation, the server receives from the client a locale of the client. Upon subsequent receipt from the client of a request to perform an operation on the file system entity, the client consults supplemental data to determine whether the requested operation is permitted on the file system entity. The supplemental data may comprise at least one of the locality information or operation expiry data.

20 Claims, 11 Drawing Sheets

(56) References Cited

U.S. PATENT DOCUMENTS

| | | | | |
|---|---|---|---|---|
| 2013/0297662 | A1 | 11/2013 | Sharma et al. | |
| 2013/0339404 | A1 | 12/2013 | Chao et al. | |
| 2015/0135300 | A1* | 5/2015 | Ford | H04L 67/1097 726/11 |

OTHER PUBLICATIONS

Cho, et al., "Secure Access Control for Location-Based Applications in WLAN Systems", In 3rd IEEE International Conference on Mobile Ad Hoc and Sensor Systems, Oct. 2006, 12 pages.

"Cloud Files: FAQs", Published on: Oct. 14, 2012, Available at: http://www.rackspace.com/knowledge_center/product-faq/cloud-files.

Abdelmajid, et al., "Location-Based Kerberos Authentication Protocol", In Proceedings of IEEE Second International Conference on Social Computing, Aug. 20, 2010, 6 pages.

"2.2.4.53.1 Request", Retrieved on: Sep. 3, 2014, Available at: http://msdn.microsoft.com/en-us/library/ee441849.aspx.

"3.2.1.3 Per SMB Session", Published on: Dec. 29, 2013, Available at: http://msdn.microsoft.com/en-us/library/ee442044.aspx.

"2.2.4.53 SMB_COM_SESSION_SETUP_ANDX (0x73)", Published on: Dec. 23, 2013, Available at: http://msdn.microsoft.com/en-us/library/ee442101.aspx.

Peterson, et al., "A Position Paper on Data Sovereignty: The Importance of Geolocating Data in the Cloud", In Proceedings of the 3rd USENIX conference on Hot topics in cloud computing, Jun. 14, 2011, 5 pages.

"Cloud Files: FAQs", Published on: Jan. 27, 2013, Available at: http://www.rackspace.com/knowledge_center/product-faq/cloud-files.

"International Search Report and Written Opinion Issued in PCT Application No. PCT/US2015/057433", Mailed Date: Jan. 22, 2016, 11 Pages.

Lotspiech, et al., "Cryptographic Containers and the Digital Library", In Verlaessliche IT-Systeme, Jan. 1, 1997, pp. 33-48.

"The Digital Property Rights Language—Manual and Tutorial—XML Edition", Retrieved from <<http://web.archive.org/web/20010425194729/http://xml.coverpages.org/DPRLmanual-XML2.html>>, Nov. 13, 1998, 64 Pages.

"International Search Report and Written Opinion Issued in PCT Application No. PCT/US2015/057435", Mailed Date: Jan. 20, 2016, 11 Pages.

"International Search Report and Written Opinion Issued in PCT Application No. PCT/US2015/057438", Mailed Date: Jan. 29, 2016, 11 Pages.

* cited by examiner

OVER NETWORK OPERATION RESTRICTION ENFORCEMENT

BACKGROUND

Computing systems and associated networks have revolutionized the way human beings work, play, and communicate. Nearly every aspect of our lives is affected in some way by computing systems. The proliferation of networks has allowed computing systems to share data and communicate, vastly increasing information access. For this reason, the present age is often referred to as the "information age".

However, in some cases, it is desirable to restrict access to data. For instance, data is often restricted so that it is only accessible by certain individuals. Those individuals must therefore authenticate before accessing the data. In other circumstances, data is to be restricted based on location. For instance, some data is to be confined within certain geographical territory. Confinement of data to a particular geographic region may be performed for a variety of reasons, such as legal, regulatory, tax or safety reasons. In some cases, data has a certain expiry associated with the data, so as to restrict when the data may be used.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the enforcement of operation restriction on a file system entity over a network. The file system entity exists on a server (which could be a single machine, a cluster of servers, or a cloud computing environment). The server facilitates setting up of a session over a network with a client. As part of this facilitation, the server receives from the client a locale of the client. Upon subsequent receipt from the client of a request to perform an operation on the file system entity, the client consults supplemental data to determine whether the requested operation is permitted on the file system entity. The supplemental data may comprise at least one locality information or operation expiry data.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the enforcement of operation restriction on a file system entity over a network. The file system entity exists on a server (which could be a single machine, a cluster of servers, or a cloud computing environment). The server facilitates setting up of a session over a network with a client. As part of this facilitation, the server receives from the client a locale of the client. Upon subsequent receipt from the client of a request to perform an operation on the file system entity, the client consults supplemental data to determine whether the requested operation is permitted on the file system entity. The supplemental data may comprise at least one of the locality or operation expiry data.

Accordingly, enforcement of operation restrictions based on locale of the client or operation expiry data may be provided even for remote operation requests. Some introductory discussion of a computing system will be described with respect to FIG. 1. Then, the structure and use of access control will be described with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
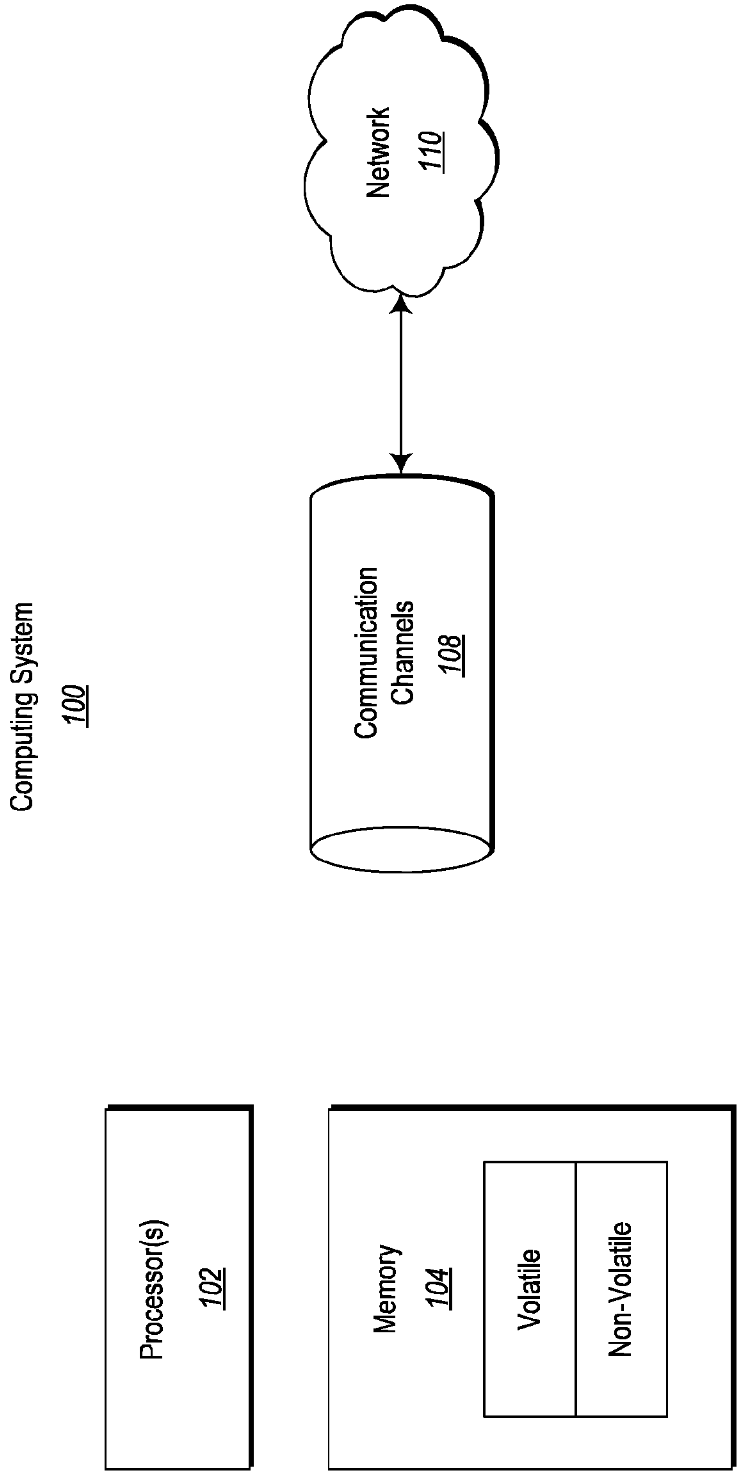
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110. The computing system 100 also includes a display, which may be used to display visual representations to a user.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
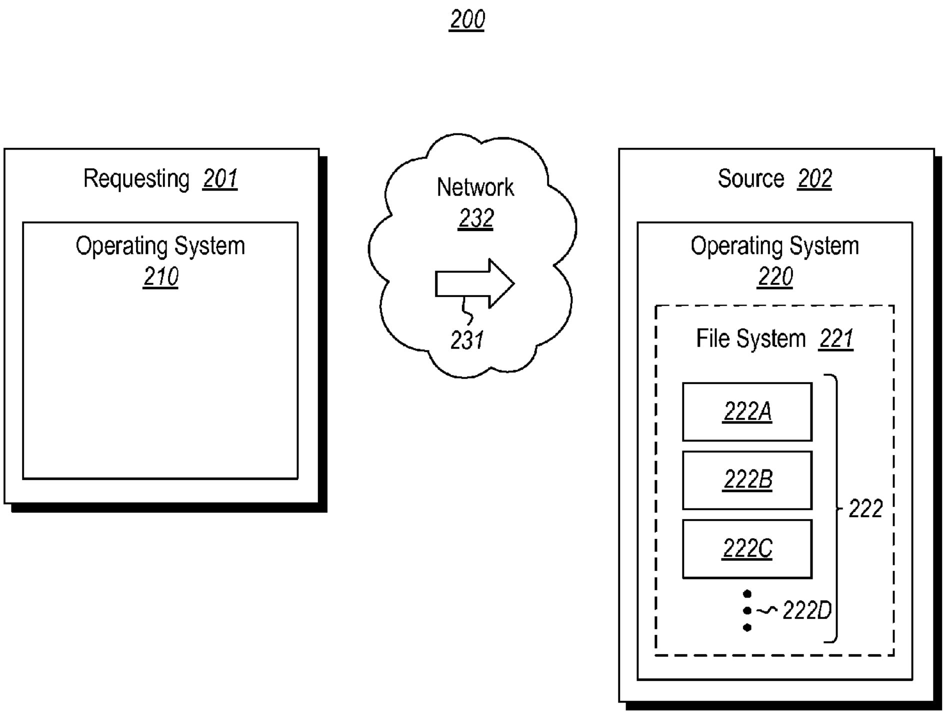
FIG. 2 illustrates a system in which a requesting system requests over a network to perform an operation on a file system entity that is within a file system of a source system.

FIG. 2 illustrates an environment 200 that includes a requesting system 201 (also referred to herein as a "client") and a source system 202 (also referred to herein as a "server"). In particular, the requesting system 201 submits a request 231 over a network 232 to the source system 202 to perform an operation on a file system entity of the source system 202.

Examples of such operations might include, for instance, read operations, update operations, copy operations, and delete operations. The file system entity might be, for example, a disk, a partition, a directory, or the most basic file system entity—a file. The network 202 might be, for instance, the Internet, another Wide Area Network (WAN), a Local Area Network (LAN), a Storage Area Network (SAN) of the like.

The requesting system 201 may be structured as described above for the computing system 100 of FIG. 1, and has operating thereon an operating system 210. The source system 202 includes an operating system 220 that maintains a file system 221 constituting multiple file system entities 222. For instance, the file system 221 is illustrated as including multiple file system entities 222 including file system entity 222A, file system entity 222B, file system entity 222C, amongst potentially many other file system entities as represented by the ellipses 222D. The source system 202 may likewise be structured as described above for the computing system 100 of FIG. 1. The source system 202 might also be a server cluster, or even a cloud computing environment.

Figure 3:
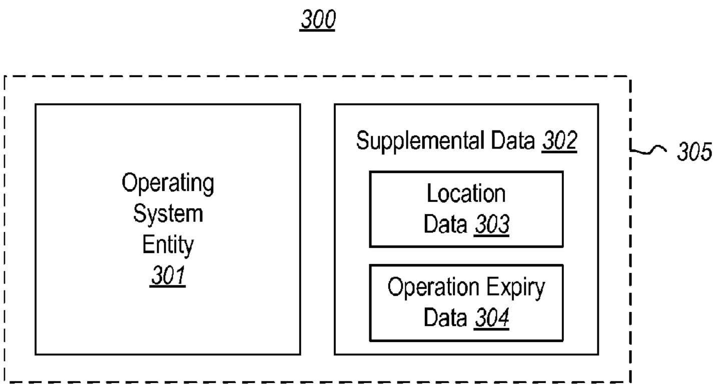
FIG. 3 illustrates a file system entity environment in which the file system entity and corresponding supplemental data are associated in such a way that if the file system entity is copied or moved, the corresponding supplemental data is also atomically copied or moved, respectively.

FIG. 3 illustrates a file system entity environment 300. The file system entity environment 300 includes a file system entity 301 as well as supplemental data 302. The supplemental data 302 includes at least one of location data 303 and operation expiry data 304. Furthermore, the supplemental data 302 is associated with the file system entity 301 as represented by the dashed box 305. This association 305 is such that the file system entity 301 and the supplemental data 302 are moved or copied atomically together. As an example, the file system entity 301 might be any of the file system entities 222 of FIG. 2. A similar file system entity environment 300 may be provided for each of multiple file system entities, such that the file system entity has associated location data and/or operation expiry data that are atomically moved or copied with the file system entity if the file system entity is moved or copied, respectively.

The association 305 may differ depending on the file system. In one example, in which the file system entity is a file, the association 305 is accomplished by including the supplemental data within an alternate data stream of the file. Such might be appropriate for instance, in a New Technology File System (NTFS)-based file system. As another example, the association 305 may be accomplished by including the supplemental data as one or more properties of the file system entity. For instance, in inode-based file systems such as XFS, ZFS and Reiser4, the supplemental data may be stored against a file using extended file properties.

For file systems which do not provide an extension to a given file system entity entry's content (such as FAT16, FAT32 and ExFAT), a fallback approach may be used where the supplemental data 302 is written to a separate file in the same directory as the file system entity (e.g., using an appropriate extension). While this is not as robust as the other approaches, it does offer some level of interoperability for legacy systems—although location-based data access enforcement and operation expiry based data access enforcement will be at the mercy of the consuming operating system.

It is not important to the principles described herein how the association 305 is made between the file system entity 301 and the supplemental data 302. Suffice it to say that regardless of how the association is made, the association is compatible with the underlying file system or environment, and is made such that if the file system entity 301 is moved or copied, so is the supplemental data 302.

Figure 4:
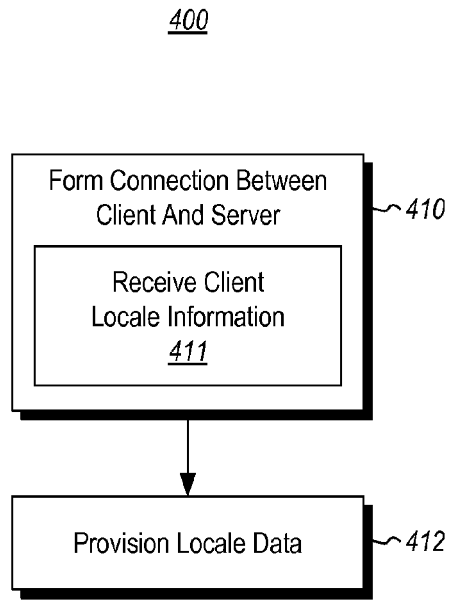
FIG. 4 illustrates a flowchart of method for setting up a connection between the requesting system and the source system, which is a first stage of enforcement of operation restrictions on file system entities.
Figure 5:
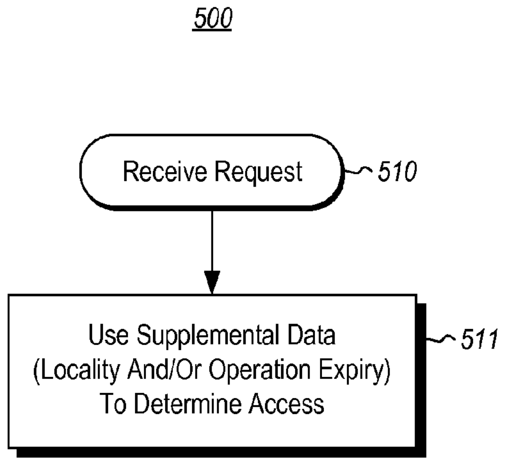
FIG. 5 illustrates a flowchart of a method for responding to requests to perform operations over the connection established by the method of FIG. 4, and represents a second stage of enforcement of operation restrictions on file system entities.

FIGS. 4 and 5 illustrate a process of enforcing operation restriction on a file system entity over a network. FIG. 4 illustrates a flowchart of a first setup phase of the enforcement. FIG. 5 illustrates a flowchart of a second operational phase of the enforcement. In particular, FIG. 4 illustrates a flowchart of method 400 for setting up a connection between the requesting system and the source system. FIG. 5 illustrates a flowchart of a method 500 for enforcing restrictions on operation requests made over the connection established in method 400 of FIG. 4. While the method 400 might be performed just one time for a particular connection, the method 500 might be performed multiple times whenever a request to perform an operation on a file system entity is received. The methods 400 and 500 may be performed in the environment 200 of FIG. 2. Accordingly, the method 400 of FIG. 4 and the method 500 of FIG. 5 will be described with frequent reference to the environment 200 of FIG. 2.

The server first facilitates a connection with a client over a network (act 410). For instance, in FIG. 2, the source system 202 (i.e., the server 202) facilitates a connection with the requesting system 201 (i.e., the client 201). As one of the incoming operations for this formulation of the connection, the server receives from the client a locale of the client (act 411). The server then provisions the data representing the locale of the client (act 412) in preparation for future operation requests received from the client. For instance, as part of this provisioning, the data representing the locale of the client may be used in the local object model for use in subsequent requests to perform operations on file system entities. Referring to FIG. 2, the client 201 and the server 202 thus establish a connection, the server 202 receives locale data of the client 201, and the server 202 provisions the locale data to be usable in response to subsequent requests from the client 201 to perform file system entity operations on any of the file system entities 222.

Figure 6:
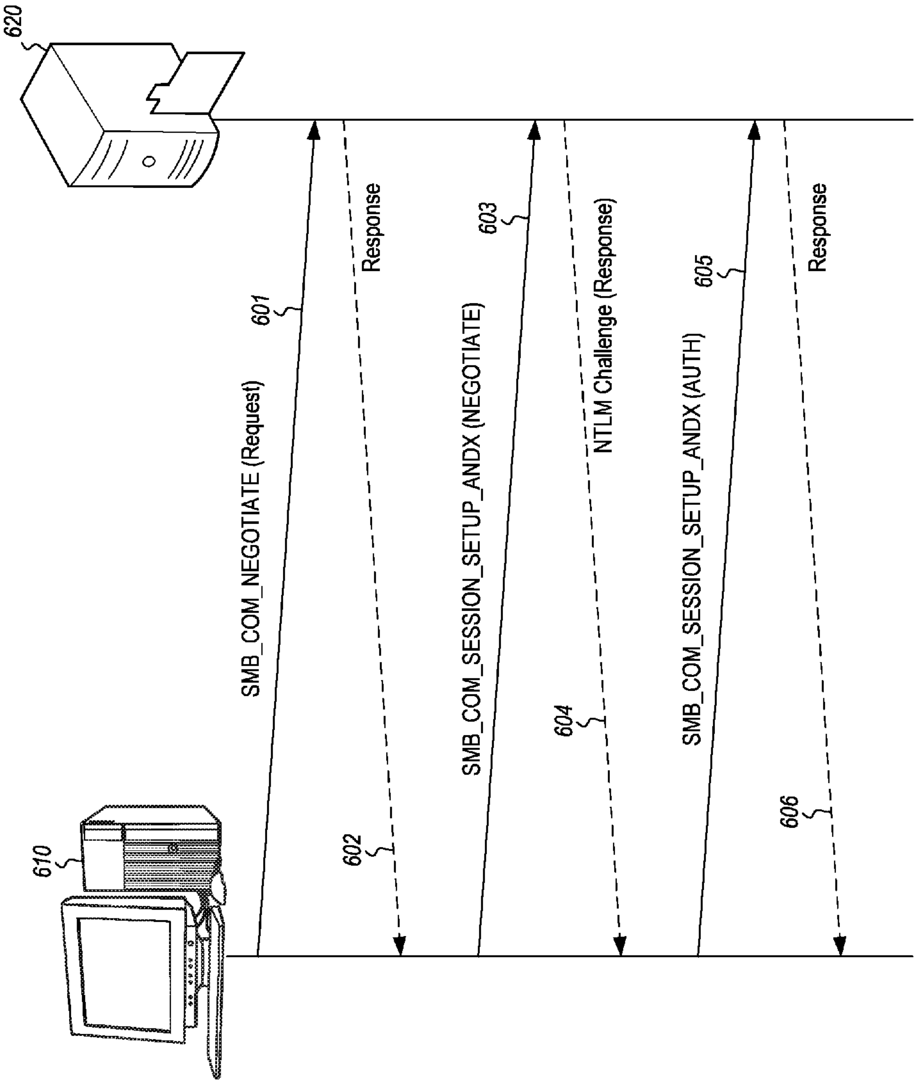
FIG. 6 illustrates a messaging diagram that illustrates signaling between the requesting system (the client) and the source system (the server) in order to establish a session.

In one embodiment, the established connection (act 410) is formulated using a Server Message Block (SMB) connection. In that case, the SMB protocol might be modified to allow a client's territory (i.e., data representing a locale of the client) to be presented to a server. Furthermore, the operation request might be a network file operation also using SMB. In this embodiment, before a networked file operation using SMB can occur, the client negotiates a connection to a server (which may just be another client on a local or inter-network), establishes a session, and then authenticates. FIG. 6 illustrates a messaging diagram 600 illustrating this process.

For instance, in accordance with diagram 600, the client 610 (an example of the client 201 of FIG. 2) sends (act 601) an SMB_COM_NEGOTIATE request to the server 620 (an example of the server 202 of FIG. 2) in accordance with the SMB protocol. In response, the server 620 sends (act 602) a response in accordance with the SMB protocol. In order for the server to understand the territory in which a client resides (which will likely not be variable, and thus is persisted for the duration of the session), additional client locale information is sent as part of session set-up.

For instance, the client 610 sends (act 603) an SMB_COM_SESSION_SETUP_ANDX negotiation message. The data structure SMB_COM_SESSION_SETUP_ANDX is defined by the SMB protocol, but includes the addition of an unsigned long, which will represent a connecting client's territory as a United Nations (UN) 2 digit letter. The new structure might be as follows (with changes to the existing structure being underlined).

```
SMB_Parameters
  {
  UCHAR WordCount;
  Words
    {
    UCHAR AndXCommand;
    UCHAR AndXReserved;
    USHORT AndXOffset;
    USHORT MaxBufferSize;
    USHORT MaxMpxCount;
    USHORT VcNumber;
    ULONG SessionKey;
    USHORT OEMPasswordLen;
    USHORT UnicodePasswordLen;
    ULONG Reserved;
    ULONG Capabilities;
    ULONG Territory;        // Newly added to provide client
                            // territory context. To be
                            // stored as Client.Session.
                            Territory (on the server)
    }
  }
  SMB_Data
    {
    USHORT ByteCount;
    Bytes
      {
      UCHAR OEMPassword[ ];
      UCHAR UnicodePassword[ ];
      UCHAR Pad[ ];
      SMB_STRING AccountName[ ];
      SMB_STRING PrimaryDomain[ ];
      SMB_STRING NativeOS[ ];
      SMB_STRING NativeLanMan[ ];
    }
}
```

Upon receipt of the unsigned local representing the client's territory, the server 620 stores the client's territory for future operations. For instance, this may be achieved by changing the abstract data model for a given client's session. Completing FIG. 6, the server 620 then sends (act 604) a response to the SMB_COM_SESSION_SETUP_ANDX (Negotiate) message in accordance with the SMB protocol. The client 610 then sends (act 605) an SMB_COM_SESSION_SETUP_ANDX authenticate message to authenticate the client 610. The server 620 responds (act 606), thereby setting up the session.

FIG. 5 illustrates a method 500 for enforcing operation restriction on a file system entity over a network. Upon receiving a request to perform an operation on the file system entity (act 510), the supplemental data is used to determine whether the requested operation is permitted on the file system entity, the supplemental data comprising at least one of the locale of the client or operation expiry data (act 511).

Two specific embodiments of method 500 will now be described in considerable detail. A first embodiment (in which only locality data and the locale of the client are used to determine whether the requested operation will be permitted) will be described with respect to FIGS. 7 through 9 (and Tables 1A through 3). A second embodiment (in which both locality data and operation expiry data are used to determine whether the requested operation will be permitted) will be described with respect to FIGS. 10 through 13 (and Tables 4A through 6).

First Embodiment

Figure 7:
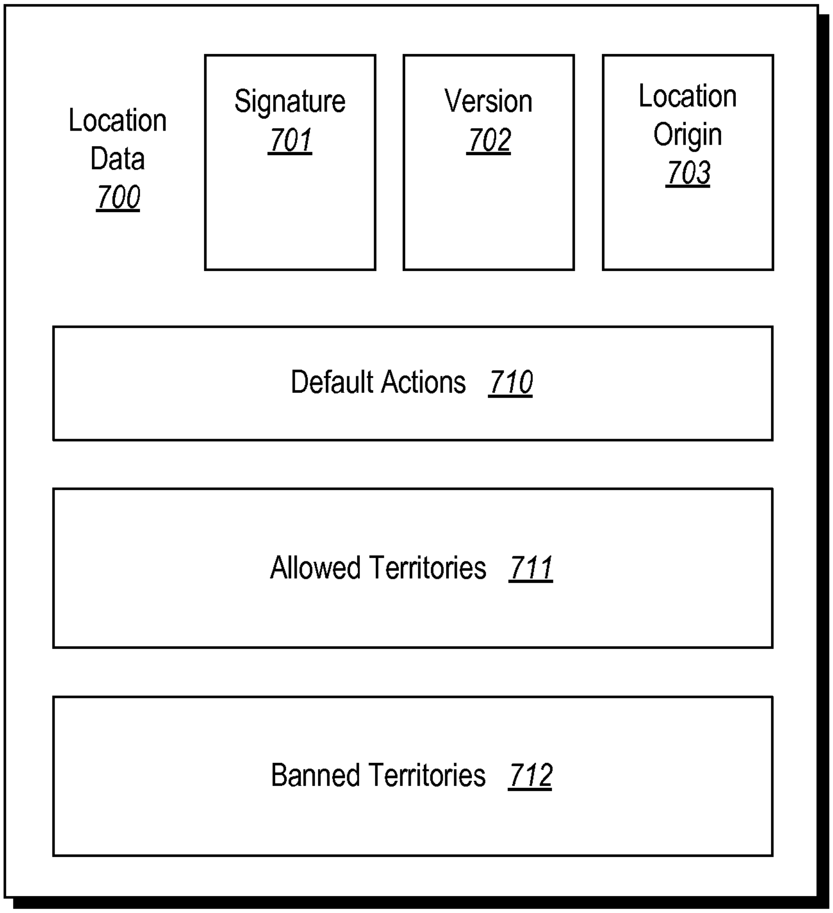
FIG. 7 illustrates location data that represents an example of the supplemental data of FIG. 3 in accordance with a first embodiment described herein.

FIG. 7 illustrate location data 700 that represents an example of the supplemental data 302 of FIG. 2. The location data 700 includes various fields that are examples of what might be included in various embodiments. There is no requirement that the location data described herein include all, or even some, of the fields described for the location data 700.

The location data 700 includes a signature 701 that perhaps allows metadata to be identified as pertaining to a time-restricted access. A version 702 field might identify the version number so as to allow advancement of the principles described herein. A location origin field 703 may identify a region at which the file system entity originated. This might be useful in situations in which access may depend on whether the location of the requestor is the same region that originated the file system entity.

The location data 700 also includes a default actions field 710 that defines what actions may be taken on the file system entity when the location of the requestor cannot be determined, or in which the requested operation is not expressly allowed in an allowed territories list 711 or expressly banned in a banned territories list 712. As an example, the default actions field 710 might simply have values from 0 to 15 (constituting four bits—also called a "nibble"). If all of the four bits are zero, then there are no default actions permitted. If the least significant bit is set (e.g., the nibble has a value of 1, 3, 5, 7, 9, 11, 13 or 15), then a copy operation is permitted as a default operation. If the second least significant bit is set (e.g., the nibble has a value of 2, 3, 6, 7, 10, 11, 14 or 15), then a read operation is permitted as a default operation. If the second most significant bit is set (e.g., the nibble has a value of 4, 5, 6, 7, 12, 13, 14 or 15), then an update operation is permitted as a default operation. If the most significant bit is set (e.g., the nibble has a value from 8 to 15, inclusive), then a delete operation is permitted as a default operation. This will be referred to hereinafter as the "nibble schema".

The location data 700 also includes an allowed territory list 711, each allowed territory having a corresponding nibble that complies with the nibble schema described above. Thus, any territory that has at least one allowed operation for requestors located within the territory, the territory will be in the allowed territory list 711. The allowed operations for the territory are defined by the bit being set in accordance with the nibble schema for the nibble corresponding to the allowed territory.

The location data 700 also includes a banned territory list 712, each banned territory having a corresponding nibble that complies with the nibble schema described above. Thus, any territory that has at least one banned operation for requestors located within the territory, the territory will be in the banned territory list 712. The banned operations for the territory are defined by the bit being set in accordance with the nibble schema for the nibble corresponding to the banned territory.

Figure 8:
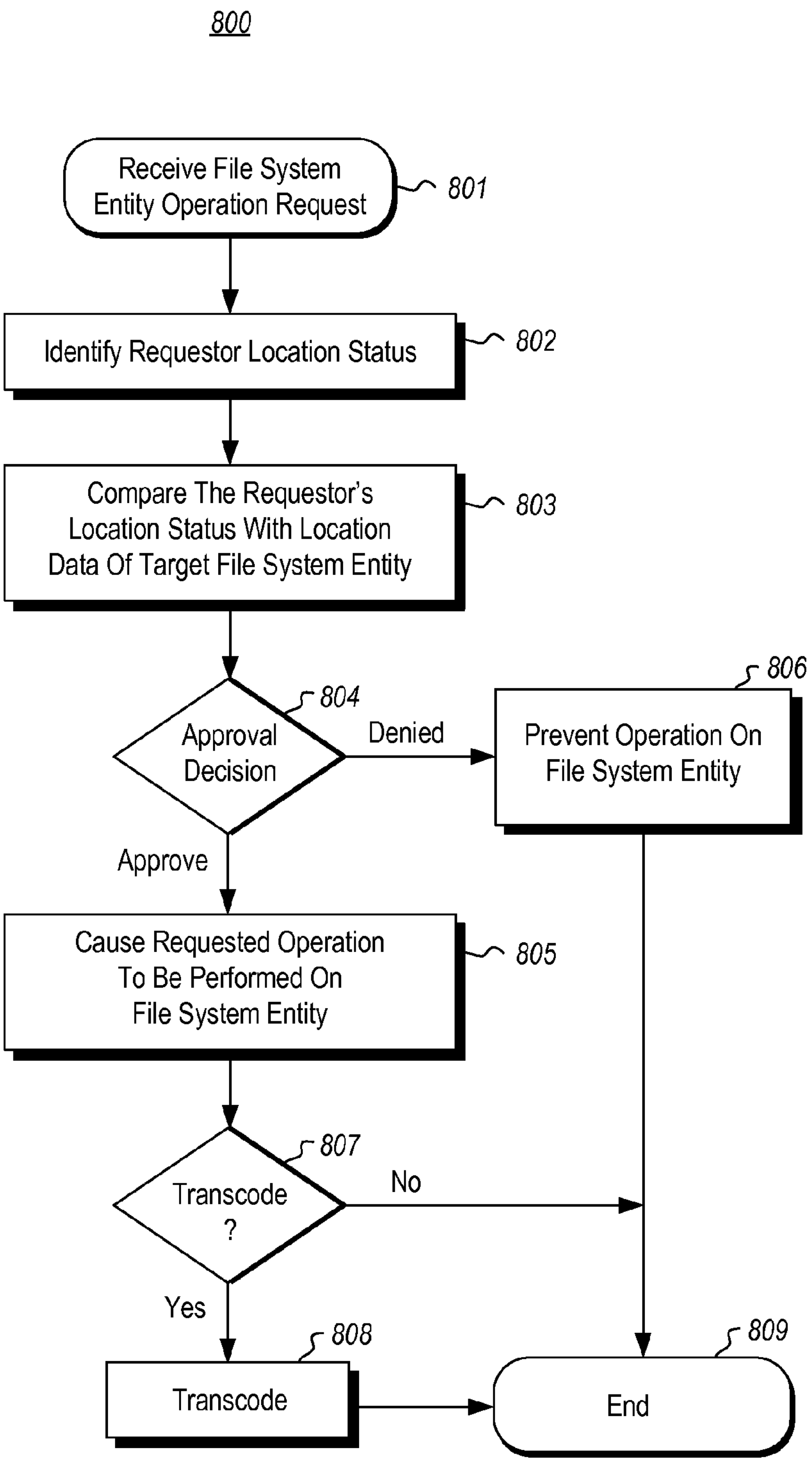
FIG. 8 illustrates a flowchart of a method for controlling access to data based on location of the requestor in accordance with the first embodiment described herein.

FIG. 8 illustrates a flowchart of a method 800 for controlling access to data based on location of the requestor. The method 800 may be performed by, for example, the source system 202 in order to control access to one of more of the file system entities 222 within its file system 221. Accordingly, the method 800 may be described with frequent reference to the FIG. 2 as an example.

The method 800 is initiated upon the source system receiving a request to perform an operation on the file system entity (act 801). For instance, in FIG. 2, the source system 202 receives the request 231 from the requesting system 201 over the network 232. For instance, suppose the request 231 is to perform a read operation upon the file system entity 222A.

The source system then identifies a location status associated with the requestor that issued the request (act 802). For instance, in FIG. 2, the source system 202 would determine the location status of the requesting entity 201. The location status might be "unknown" in cases in which the location of the requestor is not able to be determined. The location status might also be a particular location or territory where the requestor is presently located.

Then, the source system uses the location data of the file system entity and the requestors' location status to determine whether or not the requested operation is permitted on the file system entity. For instance, referencing FIG. 2, suppose that the file system entity 222A includes a file system entity environment 300, in which the file system entity 222A (or the file system entity 301) has corresponding locality data 303. The source system might thus access (e.g., deserialize) the locality data 303.

For instance, the source system may compare (act 803) the location status of the requestor (identified in act 802) with the locality data of the file system entity that is the target of the request. The source system may then determine (decision block 804) whether or not the requested operation is permitted on the file system entity based on the result of the comparison. If permitted ("Approved" in decision block 804), the source system may cause the requested operation to be performed (act 805). If not permitted ("Denied" in decision block 804), the source system prevents the requested operation (act 806).

In the case of the requested operation being performed, the source system might determine whether or not the file system entity should be transcoded so as to be compatible with the operating system 210 of the requesting system 201 (decision block 807). In the case of the file system operation being a delete, read or update operation, perhaps no transcoding is necessary ("No" in decision block 807), and the method ends (act 809).

However, in the case of a copy operation, the copied version of the file system entity might be transcoded, depending on whether the file system entity environment 300 is the same between the operation systems 210 and 220. If they are not the same, then transcoding is performed so that the location data 302 and the file system entity 301 are associated 305 in a manner suitable for the operating system 210 of the requesting entity, or the ultimate operating system in which the requestor is to use the file system entity. For instance, the copy of the file system entity might have the location data copied from an alternate data stream (if not recognized by the operating system 210) to a file property. In addition, serialization formats might be changed. If the file system entity is serialized in a manner in the source operating system 220 that is not recognized by the requesting operating system 210 (or the operating system in which the requestor intends to use the file system entity), then transcoding in the form or re-serialization might be performed.

Figure 9:
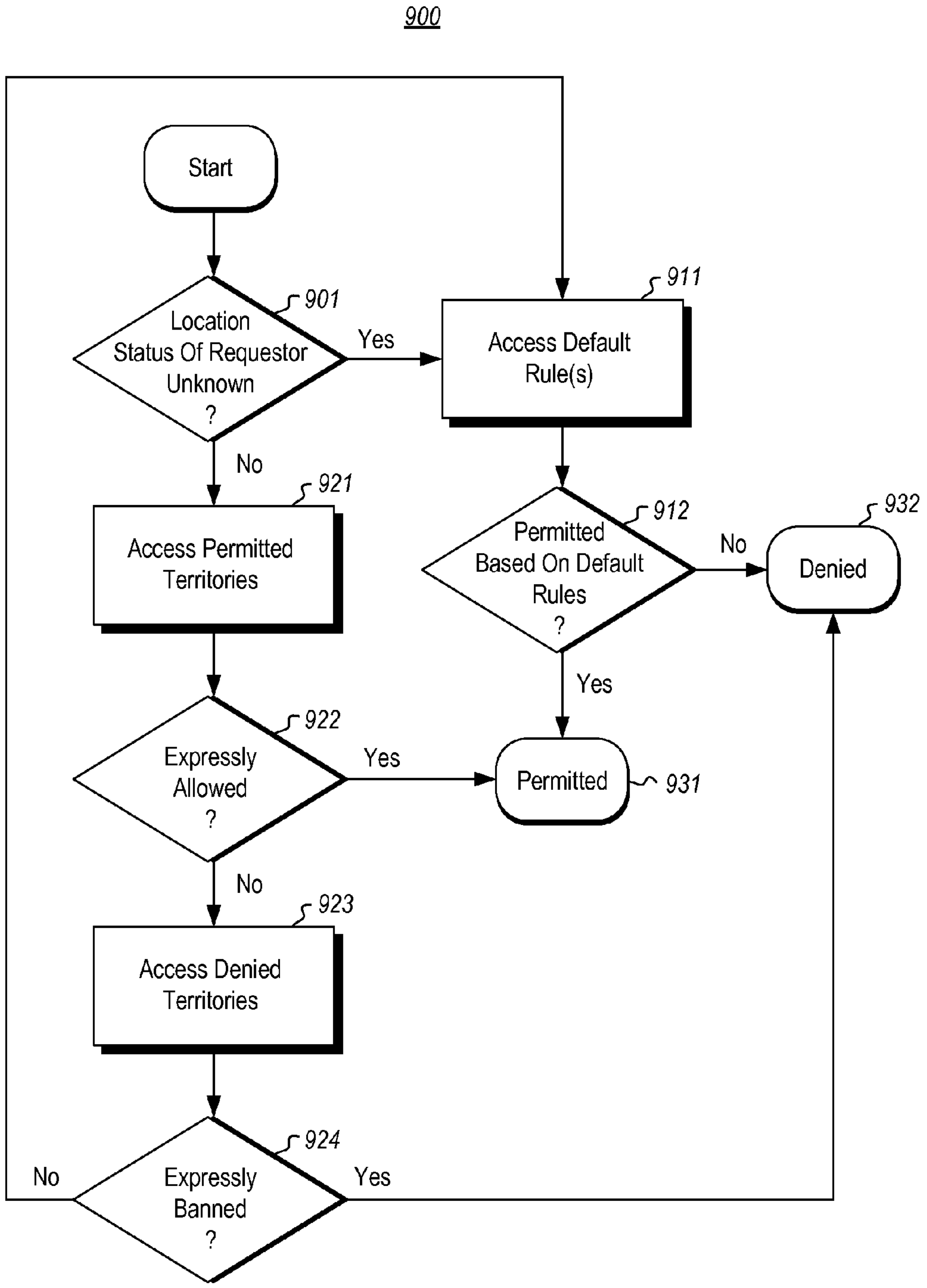
FIG. 9 illustrates a flowchart of a method for using the location data to determine whether or not the requested operation is permitted in accordance with the first embodiment described herein.

FIG. 9 illustrates a flowchart of a method 900 for using the locality data to determine whether or not the requested operation is permitted. The method 900 represents an example of act 803 and decision block 804 of FIG. 8. The method 900 is just one example of how the decision might be made. The principles described herein are not limited to that example.

First, it is determined whether or not the requestors' location status is unknown (decision block 901). If the requestor's location status is unknown ("Yes" in decision block 901), then default rules may then be accessed (act 911) defining whether or not the requested operation may be performed. For instance, such default rules may correspond to the default actions field 710 of the locality data in FIG. 7. The default rules are then consulted to determining whether or not the requested operation may be performed based on the default rule (decision block 912). If it can be performed ("Yes" in decision block 912), then the operation is approved (act 931) and otherwise ("No" in decision block 912), the operation is denied (act 932).

On the other hand, if decision block 901 results in a determination that the location status is a location of the requestor, (i.e., the location status of the requestor is not unknown—"No" in decision block 601), the list of allowed territories (or "permitted locations") is accessed (act 921). For instance, the source system may access the allowed territories field 711 of the locality data 700 corresponding to the file system entity. The source system then determines (decision block 922) whether or not the requested operation is expressly permitted by any of the permitted territories in which the requestors' location is or is within. For instance, in the case of the operation being a read operation, the source system determines whether or not (for a given allowed territory corresponding to the requestors' location), the read operation is indicated as permitted. If the operation is indicated as allowed ("Yes" in decision block 922), then the operation is permitted (act 931).

If the operation is not expressly allowed using the allowed territories ("No" in decision block 922), the list of denied territories (or "denied locations") are accessed (act 923). For instance, the source system may access the denied territories field 712 of the location data 700 corresponding to the file system entity. The source system then determines (decision block 924) whether or not the requested operation is expressly banned by any of the permitted territories in which the requestors' location is or is within. For instance, in the case of the operation being a read operation, the source system determines whether or not (for a given allowed territory corresponding to the requestors' location), the read operation is indicated as banned. If the operation is indicated as banned ("Yes" in decision block 924), then the operation is denied (act 932). Otherwise ("No" in decision block 924), the method may revert to act 911, to consult default rules. Then, permissibility of the requested operation is determined (decision block 912) in accordance with the default rules.

The principles described herein thus permit data sovereignty to be honored such that operations upon file system entities (e.g., files) may be limited by the location of the requestor. Furthermore, when the operation is permitted, and a copy of the file system is to be made available, the file system entity environment may be transcoded such that the requesting system may also have access to the location data, thereby further enforcing data sovereignty rules.

Having described an example structure of the locality data with respect to FIG. 7 in this first embodiment, three specific serialization implementations will now be described with respect to Tables 1 through 3 respectively. Tables 1A and 1B below illustrates a binary file format for the location data. Table 1A illustrates an example file header format. Table 1B illustrates example supporting data structures.

TABLE 1A

File Header

| Section | Data type | Value | Notes |
|---|---|---|---|
| Signature | 3 * byte | GEO | Magic file number to identify this metadata file format |
| Version Info | int | 10 | To be read in the form x.y (10 indicates version 1.0) |
| Country of Origin | int | — | Refers to a UN numeric country code (Eg. 826 is the United Kingdom) |

TABLE 1A-continued

| File Header | | | |
|---|---|---|---|
| Section | Data type | Value | Notes |
| Default behavior | int | | A logically OR'd value which determines whether an operation is allowed if a specific territorial rule set is not defined. Flag values: 0 = None, 1 = Copy, 2 = Read, 4 = Update, 8 = Delete. Knowing this, a value of 7 means that copy, read and update operations are allowed, by default. |
| Total allowed territories | int | — | This denotes the size of the "Allowed Territories" list, which follow immediately after this field |
| [Allowed Territory]* | t_struct | | This is a territory struct that repesents an entry in the Allowed Territories list (previously defined) |
| Total banned territories | int | — | This denotes the size of the "Banned Territories" list, which follow immediately after this value |
| [Banned Territory] * | t_struct | | This is a territory struct that repesents an entry in the Banned Territories list (previously defined) |

TABLE 1B

| Supporting data types | | | |
|---|---|---|---|
| Type name | Field Name | Data type | Notes |
| t_struct | | | Context depends on position in the file header (Eg. Allowed list or Banned list) |
| t_struct | Country Code | int | Refers to a UN numeric country code (Eg. 826 is the United Kingdom) |
| t_struct | Operation flags | int | A logically OR'd value which determines the operations allowed or banned in this territory. Flag values: 0 = None, 1 = Copy, 2 = Read, 4 = Update, 8 = Delete. Knowing this, a value of 7 means that copy, read and update operations are allowed or banned in this territory (based on context) |

Table 2 illustrates a more portable embodiment of the location data using Java-Script Object Notation (JSON).

TABLE 2

```
{
    "GEO": {                        // Magic file number denoting metadata file type
        "version": "1.0",           // Metadata file version number
        "origin": "826",            // Country of origin as a UN numberic code
                                    (826 = UK) (example)
        "default": "15",            // Default file operation flags
                                    // A logically OR'd flag list, 0 = None,
                                    //1 = Copy, 2 = Read, 4 = Update, 8 = Delete
        "allowed": [                // List of Allowed Territories (as a JSON array)
            {
                "country": 826,     // Allowed country, as a UN numeric code
                                    // (826 = UK) (example)
                "flags": 15         // A logically OR'd flag list, 0 = None,
                                    // 1 = Copy, 2 = Read, 4 = Update, 8 = Delete
                                    //In this example, the UK is allowed all file
                                    // operations
            },
            {
                "country": 784,     // Another allowed country, as a UN numeric
                                    // code (784 = UAE)
                "flags": 3          // In this example, UAE is allowed the read
                                    // operation and the copy operation.
            }
        ],
        "banned": [                 // List of Banned Territories (as a JSON array)
            {
                "country": 716,  // Banned country as a UN numeric code (716 =
                                 // Zimbabwe)
                "flags": 8       // This example, the delete file operation is banned
                                 // in Zimbabwe
            }
        ]
    }
}
```

The following Table 3 shows a portable example of the location data using an eXtensible Markup Language (XML) document.

```
<?xml version=“1.0” encoding=“utf-8” ?>
<!-- An XML based Geo-Metadata file -->
<GeoMetadata>
  <!-- Metadata version information -->
  <Version>1.0</Version>
  <!-- Country of origin -->
  <Origin>
    <IsoCode>UK</IsoCode>
    <UNCode>826</UNCode>
  </Origin>
  <!-- Default behaviour flags for a file operation not listed in a
  territory-specific rule set (Allowed or Banned)
  0 = None,
  1 = Copy,
  2 = Read,
  4 = Update (this includes filename, timestamps, metadata and file
  contents),
  8 = Delete
  -->
  <DefaultBehaviour>15</DefaultBehaviour>
  <!-- A list of allowed territories and their file operation rules -->
  <Allowed>
    <!-- There may be more than one <Territory> node at this level -->
    <Territory>
      <IsoCode>UAE</IsoCode>
      <UNCode>784</UNCode>
      <!-- Behaviour flag that indicates what operations are allowed
      in this territory. Here we can see UAE can copy or read a file -->
      <Behaviour>3</Behaviour>
    </Territory>
  </Allowed>
  <!-- A list of banned territories and their file operation rules -->
  <Banned>
    <!-- There may be more than one <Territory> node at this level -->
    <Territory>
      <IsoCode>ZWE</IsoCode>
      <UNCode>716</UNCode>
      <!-- Behaviour flag that indicates what operations are banned
      in this territory. Here we can see Zimbabwe is banned from delete
      operations -->
      <Behaviour>8</Behaviour>
    </Territory>
  </Banned>
</GeoMetadata>
```

Second Embodiment

Figure 10:
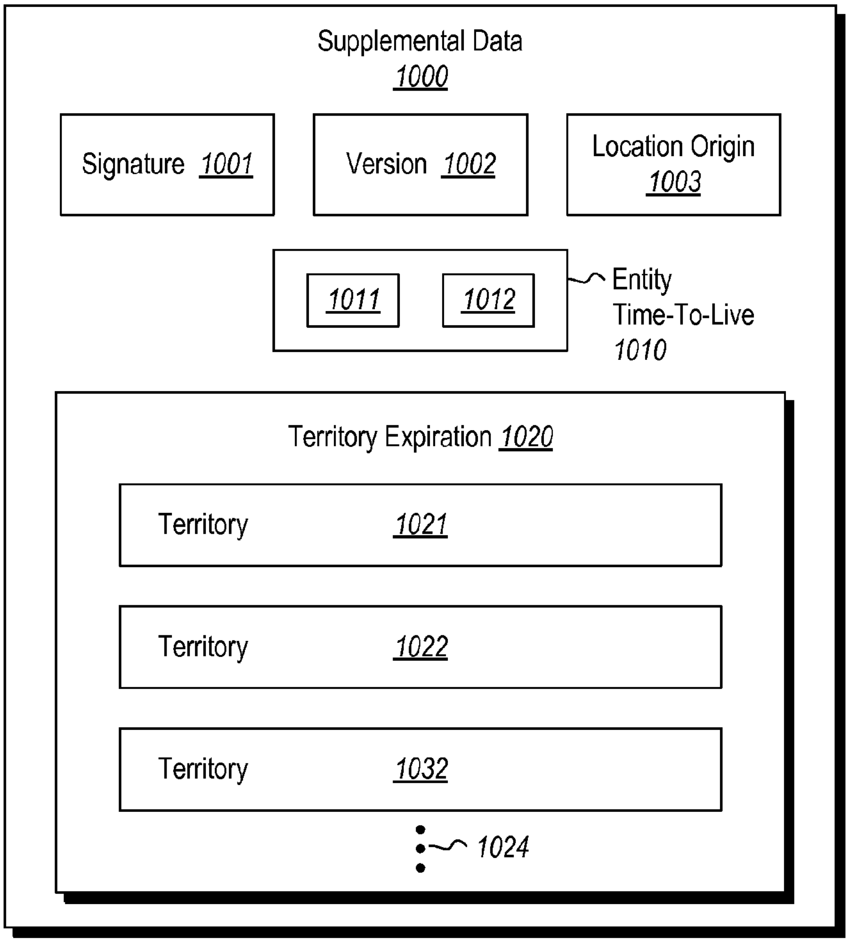
FIG. 10 illustrate supplemental data that represents an example of the supplemental data of FIG. 3 in accordance with a second embodiment described herein.

FIG. 10 illustrates supplemental data 1000 that represents the supplemental data 302 of FIG. 3. The supplemental data 1000 includes various fields that are examples of what might be included in various embodiments. There is no requirement that the locality data 303 or the operation expiry data 304 described herein include all, or even some, of the fields described for the supplemental data 1000.

The supplemental data 1000 includes a signature 1001 that perhaps allows metadata to be identified as pertaining to a time-restricted access. A version field 1002 might identify the version number so as to allow advancement of the principles described herein. A location origin field 1003 may identify a region at which the file system entity originated. This might be useful in situations in which access or operation expiry may depend on whether the location of the requestor is the same territory that originated the file system entity.

The supplemental data 1000 also includes an entity time-to-live field 1010 which, if present, may be used to define a time-to-live of the file system entity itself, regardless of location status of the requestor. In one example, the time-to-live field 1010 may include a file expiry field 1011 and a delete indicator 1012. For instance, the file expiry field 1011 might be an unsigned long, and the delete indicator 1012 might be a Boolean.

When evaluated, as an example only, a negative value in the signed long 1011 indicates that the corresponding file system entity has already expired, and is only eligible for deletion operations. The Boolean 1012 represents whether or not the file system entity is to be deleted automatically if the file system entity is found to have expired. In this example, a zero value in the signed long 1011 indicates that the file system entity currently does not have an expiry time. A positive value in the signed long 1011 indicates an expiry time, that may be compared with the current time, to determine whether or not the file system entity has expired. Again, if the signed long 1011 is used to indicate that the file system entity has expired, the Boolean 1012 is evaluated to determine whether or not the file system entity is to be deleted automatically upon detection that the file system entity has expired.

The supplemental data 1000 also includes a territory expiration field 1020. In one example, at least one of (and potentially both of) the file time-to-live field 1010 and the territory expiration field 1020 is to exist within the supplemental data 1000. The territory expiration field 1020 includes multiple territory fields, each for a corresponding territory. For instance, the territory expiration field 1020 is illustrated as including three territory fields 1021, 1022 and 1023. However, the ellipses 1024 symbolically represent that there may be any number of territory fields within the territory expiration field 1020. As an example, each territory field (1021 through 1024) might identify the corresponding country using any means. Examples of such identifies might include a United Nations country code. In one embodiment, one of the territory field is a default territory field that is applied if the location status of the requestors is unknown or not present within any of the other territories for which there is a territory field.

Figure 11:
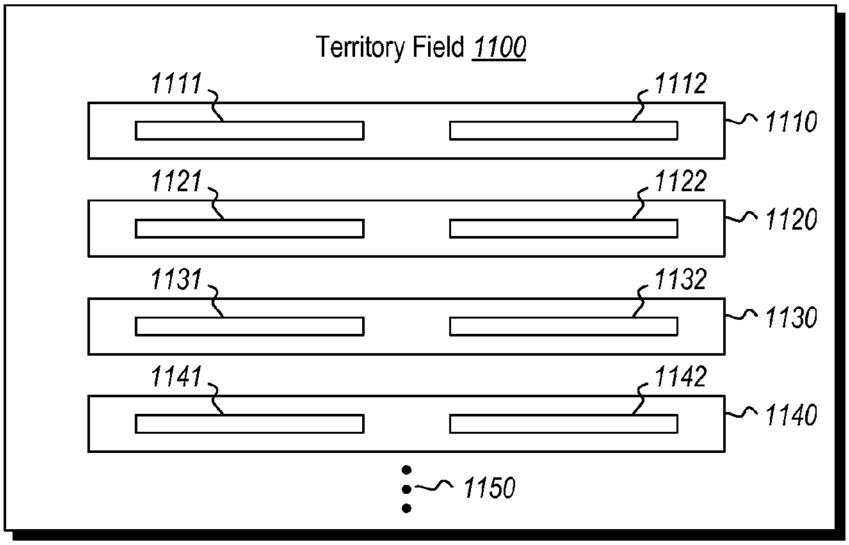
FIG. 11 abstractly illustrates a territory field that represents an example of any of the territory fields of FIG. 10.

FIG. 11 abstractly illustrates a territory field 1100 that represents an example of any of the territory fields 1021 through 1024 of FIG. 10. The territory field 1100 includes multiple operation fields. In particular, the territory field 1100 is illustrated as including four operation fields 1110, 1120, 1130 and 1140. However, the ellipses 1150 represent that there may be any number of operation fields within the territory field. Examples of operations might include read, copy, update, and delete. Each operation expiry field 1110, 1120, 1130 and 1140 includes a respective operation expiry indicator field 1111, 1121, 1131 and 1141, respectively, and a delete indicator field 1112, 1122, 1132 and 1142, respectively. If a request comes in which indicates that the requestor has a location status corresponding to one of the territories represented in the territory expiration field 1020, then the requested operation is identified to determine which operation expiry field of the respective territory field (e.g., 1021 and 1100) to use to define whether the operation is permitted, or no longer permitted. Again, in one embodiment, each operation expiry indicator field 1111, 1121, 1131 and 1141 may be an unsigned long, and each delete indicator field 1112, 1122, 1132 and 1142 may be a Boolean.

When evaluated, a negative value in the signed long for the respective operation expiry indicator field 1110, 1120, 1130, 1140 indicates that the operation for the corresponding file system entity has already expired given the requestors' location status, and is only eligible for deletion operations if permitted given the requestors' location status. The Boolean represents whether or not the file system entity is to be deleted automatically if the file system entity is found to have expired. In this example, a zero value in the signed long indicates that the respective operation on respective file system entity currently does not have an expiry time given the requestors' location status. A positive value in the signed long indicates an expiry time that may be compared with the current time to determine whether or not the respective operation for the file system entity has expired given the requestors' location. Again, if the signed long is used to indicate that the operation on the file system entity has expired given the requestors' location, the Boolean is evaluated to determine whether or not the file system entity is to be deleted automatically.

Figure 12:
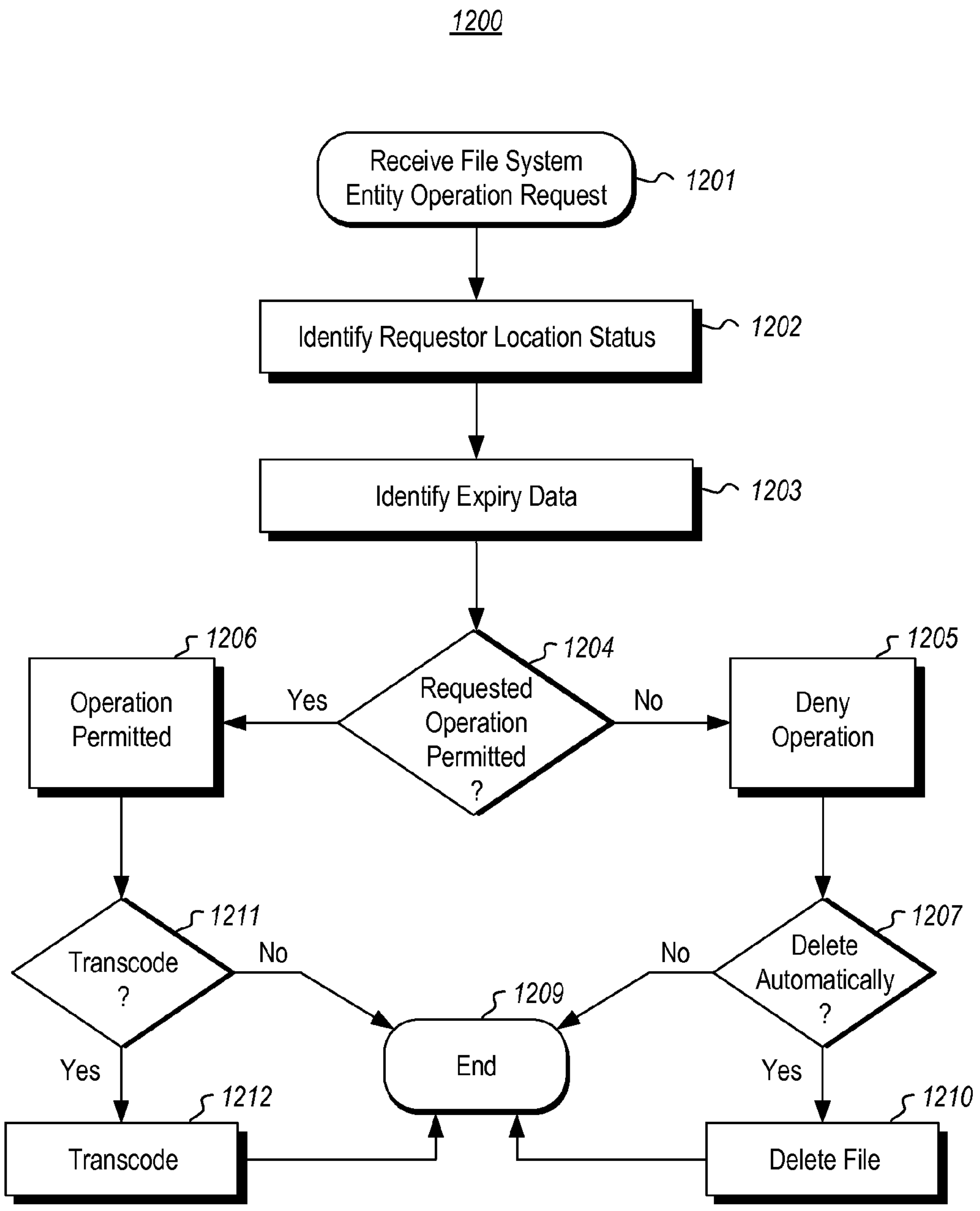
FIG. 12 illustrates a flowchart of a method for controlling access to data based on location of the requestor and operation expiry data in accordance with the second embodiment described herein.

FIG. 12 illustrates a flowchart of a method 1200 for controlling access to data based on location of the requestor and expiry data. The method 1200 may be performed by, for example, the source system 202 in order to control access to one of more of the file system entities 222 within its file system 221. Accordingly, the method 1200 may be described with frequent reference to the FIG. 2 as an example.

The method 1200 is initiated upon the source system receiving a request to perform an operation on the file system entity (act 1201). For instance, in FIG. 2, the source system 202 receives the request 231 from the requesting system 201. For instance, suppose the request 231 is to perform a read operation upon the file system entity 222A.

The source system then identifies a location status associated with the requestor that issued the request (act 1202). For instance, in FIG. 2, the source system 202 would determine the location status of the requesting entity 201. The location status might be "unknown" in cases in which the location of the requestor is not able to be determined. The location status might also be a particular location or territory where the requestor is presently located.

Then, the source system identifies expiry data (act 1203) that corresponds to the location status, and that is associated with the requested operation. For instance, referencing FIG. 2, suppose that the file system entity 222A is requested to be operated upon, and that the file system entity 222A includes a file system entity environment 300 of FIG. 3. In that case, the appropriate supplemental data (represented as supplemental data 1000 of FIG. 10) may be accessed (e.g., de-serialized). Given the location status, the appropriate territory field (e.g., 1021, 1022, 1023) of the supplemental data 1000 may be located. Furthermore, given the requested operation, the appropriate operation field (e.g., 1110, 1120, 1130 or 1140 if the territory field 1100 applies) is located.

The identified expiry data is then used to determine whether the requested operation is permitted on the file system entity (decision block 1204). For instance, as indicated above, if ("No" in decision block 1204) the unsigned long (e.g., field 1111) of the operation field (e.g., field 1110) is negative or the current time is after the time represented in the operation field, then the requested operation is denied (act 1205). For instance, this might involve the source system preventing the operation on the file system entity. On the other hand ("Yes" in decision block 1204), if the unsigned long 1111 of the operation field 1110 is zero or the current time is before the time represented in the operation expiry field, then the requested operation is permitted (act 1206).

If the operation is denied ("No" in decision block 1204), the delete upon expiry field (e.g., 1112) of the operation field (e.g., 1110) is used to determine whether the file system entity is to be deleted automatically (decision block 1207). If so ("Yes" in decision block 1207), the file system entity is deleted (act 1210). Otherwise, the method ends (act 1209) for the requested operation. The file system entity remains, but the request to operate thereon has nonetheless been denied.

In the case of the requested operation being permitted ("Yes" in decision block 1204), the method 1200 may further include causing the requested operation to be performed on the file system entity. The source system might then determine whether or not the file system entity should be transcoded so as to be compatible with the operating system 210 of the requesting system 201 (decision block 1211). In the case of the file system operation being a delete, read or update operation, perhaps no transcoding is necessary ("No" in decision block 1211), and the method ends (act 1209).

However, in the case of a copy operation ("Yes" in decision block 1211), the copied version of the file system entity might be transcoded (act 1212), depending on whether the file system entity environment 300 is the same between the operation systems 210 and 220. If they are not the same, then transcoding is performed so that the location data 302, the operation expiry data 303 (i.e., the supplemental data 1000) and the file system entity 301 are associated 304 in a manner suitable for the operating system 210 of the requesting entity, or the ultimate operating system in which the requestor is to use the file system entity. For instance, the copy of the file system entity might have the supplemental data copied from an alternate data stream (if not recognized by the operating system 210) to a file property. In addition, serialization formats might be changed. If the file system entity is serialized in a manner in the source operating system 220 that is not recognized by the requesting operating system 210 (or the operating system in which the requestor intends to use the file system entity), then transcoding in the form or re-serialization might be performed.

Figure 13:
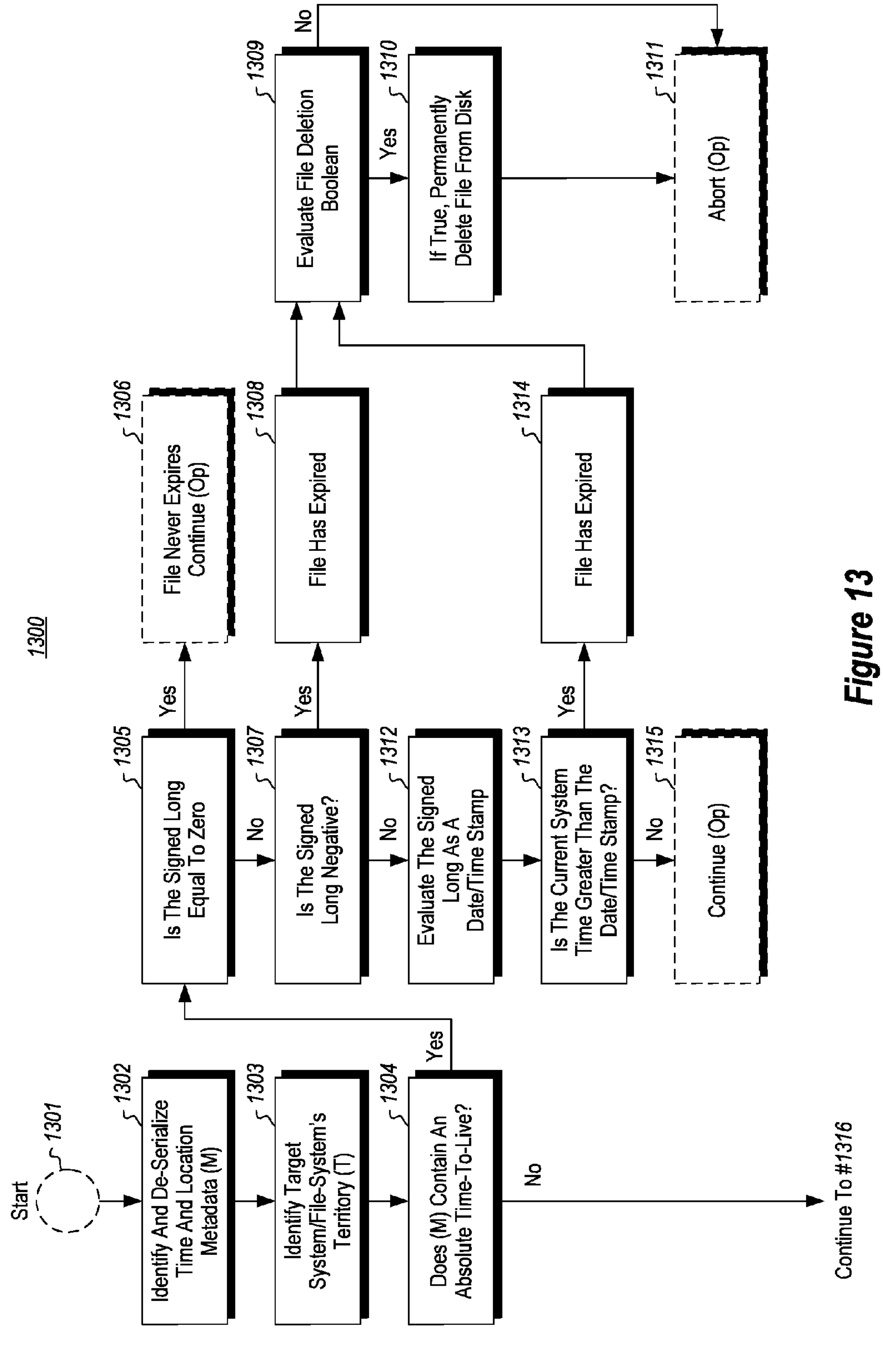
FIG. 13 illustrates a more specific method for controlling access to a file system entity based on the location status of the requestor and based on operation-specific expiry data in accordance with the second embodiment described herein.
Figure 13:
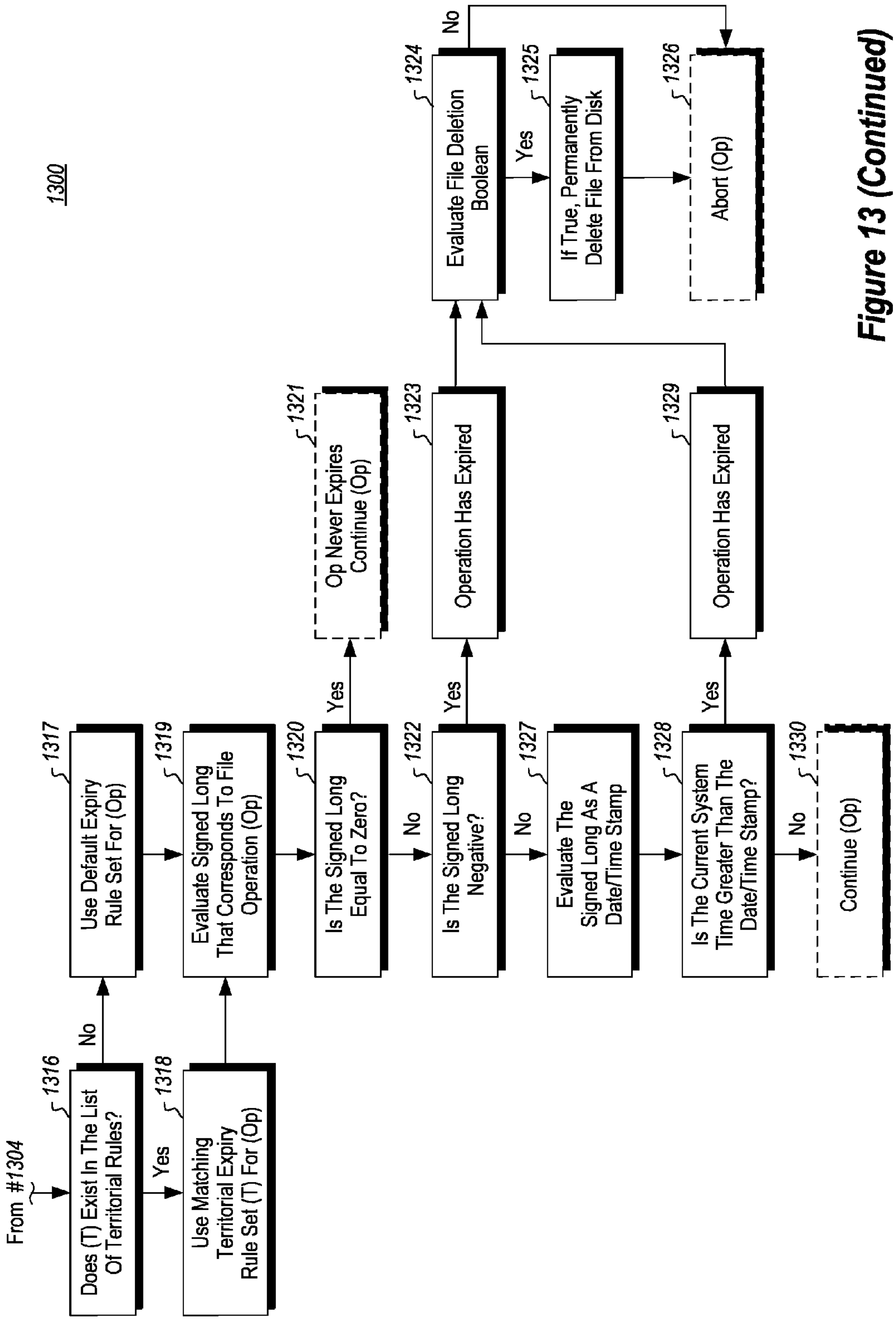

FIG. 13 illustrates a more specific method 1300 for controlling access to a file system entity based on the location status of the requestor and based on operation-specific expiry data. Upon receiving the request (act 1301), the method 1300 is initiated. The supplemental data 1000 (referred to in FIG. 13 as "time and location metadata (M)") for the corresponding file system entity is then accessed (act 1302). This might involve de-serializing the supplemental data 1000.

The location status of the requestor is then determined (act 1303). Act 1303 is an example of act 1202 of FIG. 12. The location status might be "unknown" in the case in which the location of the requestor cannot be determined.

It is then determined whether or not there is any entity time-to-live data (e.g., the field 1010 is validly populated) in the supplemental data 1000 (act 1304). If there is ("Yes" in decision block 1304), the method 1300 engages in acts 1305 through 1315 (some of which being conditional), which have not been described above with respect to FIG. 12.

Specifically, if the signed long for the entity time-to-live data is equal to zero ("Yes" in decision block 1305), this means the file system entity never expires, and thus the operation is permitted (act 1306). On the other hand ("No" in decision block 1305), if the signed long is negative ("Yes" in decision block 1307), then it is determined that the file system entity has already expired (act 1308). In that case, the file delete indicator 1012 is evaluated (decision block 1309). If that Boolean is true ("Yes" in decision block 1309), then the file system entity is deleted from disk (act 1310), and the operation is aborted (act 1311). Otherwise, if the Boolean is false ("No" in decision block 1309), then the operation is aborted (act 1311) without deleting the file system entity (bypassing act 1310).

If the signed long is neither zero ("No" in decision block 1305), and is not negative ("No" in decision block 1307), then the signed long is evaluated as a date/time stamp (act 1312). An example of a date/time stamp is a Unix date/time stamp. If the current time is greater than the date/time stamp ("Yes" in decision block 1313), then the file is determined again to have expired (act 1314), and again the delete indicator 1012 is evaluated (decision block 1309). Again, if the file delete indicator 1012 is set ("Yes" in decision block 1309), then the file system entity is deleted (act 1310) and the requested operation aborted (act 1311). If the delete indicator 1012 is not set ("No" in decision block 1309), then the requested operation is aborted (act 1311) without deleting the file system entity. If the signed long is positive ("No" in decision blocks 1305 and 1307), and the current time is less than the date/time stamp ("No" in decision block 1315), then the requested operation is permitted to continue (act 1315).

Returning to decision block 1304, if the supplemental data does not include a validly populated entity time-to-live field 1010 ("No" in decision block 1304), then it is determined (decision block 1316) if the location status of the requestor is either unknown or not otherwise within the list of territories in the territory field 1020 ("No" in decision block 1316). In that case, a default expiry rule set is used for the operation (act 1317) (an "expiry rule set" of FIG. 13 corresponds to a territory field (e.g., 1021 through 1024) of FIG. 10). For instance, in one embodiment, the territory field 1021 might be used in the case of the territory of the requestor either being unknown or not within the other listed territories. If the location of the requestor is a particular location corresponding to an actual territory corresponding to the territory fields ("Yes" in decision block 1316), then the expiry rule set for the specific territory is used (act 1318). For instance, perhaps territory field 1021 corresponds to an unknown location status (i.e., is a default rule set), whereas territory field 1022 might correspond to the United Kingdom. In that case, if the requestor was determined to be located within the United Kingdom, then territory field 1022 would be used.

In any case, whether through a default rule set (act 1317) or through the use of a territory rule set (act 1318), a rule set is acquired, and the relevant operation expiry field is acquired. For instance, if the requested operation were a copy operation, and the operation field 1110 was for a copy operation. The operation expiry indicator field 1111 would be accessed, and evaluated (act 1319). This would correspond to act 1203 of FIG. 12.

Specifically, if the signed long for the operation expiry indicator field is equal to zero ("Yes" in decision block 1320), this means the operation of the file system entity never expires (determination 1321) given the requestor's location status, and thus the operation is permitted. On the other hand ("No" in decision block 1320), if the signed long is negative ("Yes" in decision block 1322), then it is determined that the operation on file system entity has already expired (act 1323) given the requestor's location status. In that case, the deletion indicator field (e.g., 1112 for operation field 1110) is evaluated (decision block 1324). If that Boolean is true ("Yes" in decision block 1324), then the file system entity is deleted from disk (act 1325), and the operation is aborted (act 1326). Otherwise, if the Boolean is false ("No" in decision block 1324), then the operation is aborted (act 1326) without deleting the file system entity (bypassing act 1325).

If the signed long is neither zero ("No" in decision block 1320), and is not negative ("No" in decision block 1322), then the signed long is evaluated as a date/time stamp (act 1327). Again, an example of a date/time stamp is a Unix date/time stamp. If the current time is greater than the date/time stamp ("Yes" in decision block 1328), then the operation on the file system entity is determined again to have expired (act 1329), and again the delete indicator field 1112 is evaluated (decision block 1324). Again, if the delete indicator 1012 is set ("Yes" in decision block 1324), then the file system entity is deleted (act 1325) and the requested operation aborted (act 1326). If the delete indicator field 1112 is not set ("No" in decision block 1324), then the requested operation is aborted (act 1326) without deleting the file system entity. If the signed long is positive ("No" in decision blocks 1320 and 1322), and the current time is less than the date/time stamp ("No" in decision block 1328), then the requested operation is permitted to continue (act 1330).

The principles described herein thus permit data sovereignty and expiry data to be honored at the granularity of a single operation such that operations (and their expirations) upon file system entities (e.g., files) may be limited by the location of the requestor. Furthermore, when the operation is permitted, and a copy of the file system is to be made available, the file system entity environment may be transcoded such that the requesting system may also have access to the location data and the operation expiry data, thereby further enforcing data sovereignty rules with respect to access and expiration.

Having described an example structure of the supplement data in this second embodiment with respect to FIG. 10, three specific serialization implementations will now be described with respect to Tables 4A through 6 respectively. Tables 4A and 4B below illustrates a binary file format for the supplemental data. Table 4A illustrates an example file header format. Table 4B illustrates example supporting data structures.

TABLE 4A

File Header

| Section | Data type | Value | Notes |
|---|---|---|---|
| Signature | 4 * byte | TIME | Magic file number to identify this metadata file format |
| Version Info | int | 10 | To be read in the form x.y (10 indicates version 1.0) |
| Use Absolute TTL? | Boolean | — | This value determines whether to use Absolute Time-To-Live behavior (true) or a territory-specific ruleset (false) |
| Territory Count | int | n | The total number of territory-specific file operation expiry rules. If the previous field is 'true', then this number will be '0' |
| [Absolute Time-To-Live] | ttl_struct | | Only present if 'Use Absolute TTL' equals 'true' |
| [Territory rule set] * n | geo_struct | | If 'Use Absolute TTL' equals 'false', then there will be one geo_struct for each territorial rule set defined (up to the maximum defined 'Territory Count') |
| [Default rule set] | def struct | | If 'Use Absolute TTL' equals 'false', there will be a def_struct to represent the default rule set to use if a territory is not defined in the previous collection of geo_struct |

TABLE 4B

Supporting data types

| Type name | Field Name | Data type | Notes |
|---|---|---|---|
| ttl_struct | | | If present, this determines a file's absolute time-to-live |
| ttl_struct | Time Stamp | signed long | A negative value indicates that a file has already expired. A zero value indicates that a file will never expire. A positive number represents a unix date/timestamp. Once this |

TABLE 4B-continued

| Supporting data types | | | |
|---|---|---|---|
| Type name | Field Name | Data type | Notes |
| | | | date/timestamp has passed, this file will no longer be eligible for any file operation other than deletion. |
| ttl_struct | Delete on expiry | bool | This determines whether the operating system should physically delete the file from disk (without any intermediary recovery data stores - Eg. The recycling bin) |
| geo_struct | | | If present, this represents a file operation expiry rule set that applies to a specific territory |
| geo_struct | Territory | int | Refers to a UN numeric country code (Eg. 826 is the United Kingdom), used to provide territorial context for the file operation expiry rules in this struct |
| geo_struct | Delete on expiry | bool | This determines whether the operating system should physically delete the file from disk if a given operation expires |
| geo_struct | Copy expiry | signed long | A negative value indicates that this operation can never occur. A zero value indicates that this operation can never expire. A positive value is a unix date/timestamp which represents the deadline after which copy operations are no longer permitted in this territory. |
| geo_struct | Read expiry | signed long | A negative value indicates that this operation can never occur. A zero value indicates that this operation can never expire. A positive value is a unix date/timestamp which represents the deadline after which read operations are no longer permitted in this territory. |
| geo_struct | Update expiry | signed long | A negative value indicates that this operation can never occur. A zero value indicates that this operation can never expire. A positive value is a unix date/timestamp which represents the deadline after which update operations are no longer permitted in this territory. Update operations include changes to file timestamps, ownership, metadata and content. |
| geo_struct | Delete expiry | signed long | A negative value indicates that this operation can never occur. A zero value indicates that this operation can never expire. A positive value is a unix date/timestamp which represents the deadline after which delete operations are no longer permitted in this territory |
| def_struct | | | This represents the default file operation expiry rule set to use if a specific territorial rule set cannot be found |
| def_struct | Delete on expiry | bool | This determines whether the operating system should physically delete the file from disk if a given operation expires |
| def_struct | Copy expiry | signed long | A negative value indicates that this operation can never occur. A zero value indicates that this operation can never expire. A positive value is a unix date/timestamp which represents the deadline after which copy operations are no longer permitted in this territory. |
| def_struct | Read expiry | signed long | A negative value indicates that this operation can never occur. A zero value indicates that this operation can never expire. A positive value is a unix date/timestamp which represents the deadline after which read operations are no longer permitted in this territory. |
| def_struct | Update expiry | signed long | A negative value indicates that this operation can never occur. A zero value indicates that this operation can never expire. A positive value is a unix date/timestamp which represents the deadline after which update operations are no longer permitted in this territory. Update operations include changes to file timestamps, ownership, metadata and content. |
| def_struct | Delete expiry | signed long | A negative value indicates that this operation can never occur. A zero value indicates that this operation can never expire. A positive value is a unix date/timestamp which represents the deadline after which delete operations are no longer permitted in this territory. |

Table 5 illustrates a more portable embodiment of the location data using Java-Script Object Notation (JSON).

TABLE 5

```
{
  "EXPIRY" : {
    "version" : 1.0,              // This file must contain one of the [Optional]
                                  elements below to be valid
    "origin" : 826,               // The country of origin for this file (UN country
                                  code. 826 = UK)
    "TTL" : {                     // [Optional] Absolute Time-To-Live
      "timestamp" : "1420070400",   // Signed integer that denotes file expiry
                                  // behaviour
                                  //-1 = File has already expired
                                  // 0 = File never expires
```

TABLE 5-continued

```
                              // >0 = Unix timestamp for file expiry (in this
                              // case 01/01/2015)
     "deleteOnExpiry" : true  // Determines whether to delete this file from the
                              // filesystem upon expiry. Deletion should NOT
                              // use intermediary recovery stores
   },
   "expiry" : {               // [Optional] Territory-specific operation expiry
                              // rules
     "geo_expiry" : [         // This is a list (array) of territories and their
                              // operation expiry rules
                              // Only one territory entry is shown for brevity
       {
         "country": 784,      // The country this specific rule applies to (UN
                              // country code. 826 = UAE)
         "deleteOnExpiry" : true,  // Determines whether to delete this file
                              // from the filesystem upon expiry. Deletion
                              // should NOT use intermediary recovery stores
         "copy": "-1",        // Signed integer that governs copy operation
                              // expiry
         "read": "1420070400", // Signed integer that governs read
                              // operation expiry
         "update": "-1",      // Signed integer that governs update operation
                              // expiry
         "delete": "0",       // Signed integer that governs delete operation
                              // expiry
       }
     ],
     "default_expiry" : {     // This is the default operation expiry rule set to
                              // use if a specific territorial rule set cannot be
                              // found
       "deleteOnExpiry" : true,    // Determines whether to delete this file
                              // from the filesystem upon expiry. Deletion
                              // should NOT use intermediary recovery stores
       "copy": "-1",          // Signed integer that governs copy operation
                              // expiry
       "read": "1420070400",     // Signed integer that governs read
                              // operation expiry
       "update": "-1",        // Signed integer that governs update operation
                              // expiry
       "delete": "0",         // Signed integer that governs delete operation
                              // expiry
     }
   }
  }
}
```

The following Table 6 shows a portable example of the location data using an eXtensible Markup Language (XML) document.

TABLE 6

```
<?xml version="1.0" encoding="utf-8" ?>
<!-- An XML-based version of time-sensitive metadata -->
<!-- A file must contain one of the [Optional]nodes -->
<TimeMetadata>
  <!-- Metadata version information -->
<Version>1.0</Version>
<!-- Country of origin -->
<Origin>
  <IsoCode>UK</IsoCode>
  <UNCode>826</UNCode>
</Origin>
<!-- [Optional] Absolute Time-To-Live -->
<AbsoluteTimeToLive>
  <!-
    A negative value indicates that this file has already expired.
    A zero-value indicates that this file will never expire.
    A positive value indicates a Unix Date/Timestamp, representing
    the date and time after which file access is no longer allowed.
  -->
  <TimeStamp>1420070400</TimeStamp>
  <!-- Determines whether the file should be deleted
  upon expiry -->
  <DeleteOnExpiry>true</DeleteOnExpiry>
</AbsoluteTimeToLive>
<!-- [Optional] Territory-specific operation expiry rules -->
```

TABLE 6-continued

```
<Expiry>
  <!-- The list of territories and their rule sets -->
  <GeoExpiry>
    <!-- Only one entry is shown at this level for brevity -->
    <Territory>
      <!-- Territorial information -->
        <IsoCode>ZWE</IsoCode>
        <UNCode>716</UNCode>
        <!-- Determines whether to delete the file upon operation
        expiry -->
        <DeleteOnExpiry>true</DeleteOnExpiry>
        <!-- Operation expiry detail for this territory -->
        <Copy>-1</Copy>
        <Read>1420070400</Read>
        <Update>-1</Update>
        <Delete>0</Delete>
      </Territory>
    </GeoExpiry>
    <!-- The default expiry rule set to use if a specific territory cannot
    be found -->
    <Default>
      <!-- Determines whether to delete the file upon operation
      expiry -->
      <DeleteOnExpiry>true</DeleteOnExpiry>
      <!-- Default file operation expiry -->
      <Copy>-1</Copy>
      <Read>1420070400</Read>
      <Update>-1</Update>
      <Delete>0</Delete>
```

TABLE 6-continued

```
    </Default>
  </Expiry>
</TimeMetadata>
```

Accordingly, a mechanism for preserving sovereignty of data with expiry enforced by territory and operation-specific time-to-live has been described.

Claim Support Section

Herein described is a method for enforcing operation restriction on a file system entity over a network, the method comprising: an act of the source computing system receiving a locale of a requesting computing system as part of an incoming communication of a session; an act of receiving as part of the session a request to perform an operation on the file system entity; and an act using supplemental data to determine whether the requested operation is permitted on the file system entity, the supplemental data comprising at least one of locality data or operation expiry data.

The method may further comprises the following if it is determined that the requested operation is permitted: an act of causing the requested operation to be performed on the file system entity. In that case, the act of causing the requested operation to be performed comprising: an act of transcoding the file system entity to be a transcoded file system entity that is suitable for an operating system of the requesting computing system; and/or an act of transcoding the file system entity to be in a serialization implementation that is implemented by an operating system of the requesting computing system. The method may further comprise: an act of including the locale of the requesting computing system in a local object model for use in subsequent requests from the requesting computing system to perform operations on file system entities.

Also herein described is a computer program product comprising one or more computer-readable storage media having thereon one or more computer-executable instructions that are structured such that, when executed by one or more processors of a source computing system, cause the source computing system to perform the following: an act of a source computing system setting up a session over a network with a requesting computing system; an act of the source computing system responding to receipt of a locale of the requesting computing system over the session by storing the locale of the requesting computing system; and an act of performing the following in response to receiving from the requesting computing system a request to perform an operation on a file system entity: an act using supplemental data to determine whether the requested operation is permitted on the file system entity, the supplemental data comprising at least one of the locality data or the operation expiry data.

The computer-executable instructions may be further structured such that, when executed by the one or more processors, the source computing system is further caused to perform the following: an act of associating the supplemental data with the file system entity such that the supplemental data and the file system entity are moved or copied atomically together. The act of associating the supplemental data with the file system entity may comprise: an act of including the supplemental in an alternate data stream of the file system entity. The act of associating the supplemental data with the file system entity may comprise: an act of including the supplemental data as one or more properties of the file system entity.

The act of using one or more of locality data or operation expiry data to determine whether the requested operation is permitted on the file system entity may comprise: an act of using the locality data to determine whether the requested operation is permitted on the file system entity. The act of using the locality data to determine whether or not the requested operation is permitted further may comprise the following: an act of accessing a set of one or more permitted territories from the locality data, each permitted territory associated with one or more operation types that are permitted; an act of determining that the locale of the client is within a permitted territory for which the requested operation is expressly permitted; and an act of approving the requested operation if the requested operation is determined to be of an operation type for which the locale of the client is within any of the corresponding set of one or more permitted locations. The act of using the locality data to determine whether or not the requested operation is permitted further may comprise: an act of accessing a set of one or more banned territories from the locality data, each banned territory associated with one or more operation types that are banned; an act of determining that the locale of the client is within a banned territory for which the requested operation is expressly banned; and an act of denying the requested operation if the act requested operation is determined to be of an operation type for which the location of the requestor is within any of the corresponding set of one or more banned locations.

The act of using one or more of locality data or operation expiry data to determine whether the requested operation is permitted on the file system entity comprising: an act of using the operation expiry data to determine whether the requested operation is permitted on the file system entity.

The act of using one or more of locality data or operation expiry data to determine whether the requested operation is permitted on the file system entity may comprise: an act of using both the locality data and the operation expiry data to determine whether the requested operation is permitted on the file system entity, the operation expiry data associated with the locale of the requesting computing system, the file system entity, and the requested operation. The act of using the supplemental data to determine whether the requested operation is permitted on the file system entity may comprise: an act of determining an expiry time in the operation expiry data associated with the locale of the requesting computing system, the file system entity, and the request operation; an act of determining that a relevant time to compare to the expiry time; and an act of determining whether to determine whether the requested operation is permitted based on the comparison of the relevant time to the expiry time.

Also herein described is a source computing system that comprises: one or more computer-readable storage media having thereon a plurality of file system entities managed by an operating system of the source computing system; and one or more processors. The one or more computer-readable storage media having thereon one or more computer-executable instructions that are structured such that, when executed by the one or more processors of the source computing system, cause the source computing system to perform the following: an act of a source computing system setting up a session over a network with a requesting computing system; an act of the source computing system responding to receipt of a locale of the requesting computing system over the session by storing the locale of the requesting computing system; and an act of performing the following in response to receiving from the requesting computing system a request to perform an operation on a file system entity of the plurality of file system entities: an act using supplemental data to determine whether the requested operation is permitted on the file system entity, the supplemental data comprising at least one of the locale of the locality data or the operation expiry data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system, comprising:

one or more processors;

one or more network interfaces;

one or more storage devices; and one or more computer-readable media having stored thereon computer-executable instructions that are executable by the one or more processors to cause the computer system to utilize locale information when permitting or denying requested operations on a plurality of files stored at the one or more storage devices, the computer-executable instructions including instructions that are executable to cause the computer system to perform at least the following:

receive, over the one or more network interfaces, a request from a remote computer system requesting performance of a requested operation on a particular file that is stored at the one or more storage devices;

based at least on receiving the request, identify a geographical locale of the remote computer system;

access data that is associated with the particular file, the data including one or more territory fields, each territory field being associated with a corresponding locale and including one or more operation fields, each operation field specifying (i) a corresponding type of operation that can be performed on the particular file by remote computer systems requesting the particular file from the corresponding locale and (ii) an operation expiry indicator defining a time period during which the corresponding operation can be performed;

based at least on accessing the data, identify that the data includes a particular territory field that is associated with the identified geographical locale of the remote computer system;

permit or deny performance of the requested operation on the particular file, including one of:

based at least on there being a particular operation field in the identified particular territory field that is associated with the requested operation, and based at least on a particular time period defined by a particular operation expiry indicator of the particular operation field having not expired, determining to permit performance of the requested operation on the particular file, and performing the requested operation on the particular file;

based at least on there being the particular operation field in the identified particular territory field that is associated with the requested operation, and based at least on the particular time period defined by the particular operation expiry indicator of the particular operation field having expired, determining to deny performance of the requested operation on the particular file; or based at least on there being no particular operation field in the identified particular territory field that is associated with the requested operation, determining to deny performance of the requested operation on the particular file; and send, over the over the one or more network interfaces, a response to the remote computer system indicating whether the requested operation was permitted or denied.

2. The computer system of claim 1, wherein the data is stored at the one or more storage devices.

3. The computer system of claim 2, wherein the data is stored as an alternate data stream associated with the particular file.

4. The computer system of claim 2, wherein the data is stored as an extended property of the particular file.

5. The computer system of claim 1, wherein identifying the geographical locale of the remote computer system comprises identifying a locale that was specified in the request.

6. The computer system of claim 1, wherein the data that is associated with the particular file defines an expiration time period for the particular file.

7. The computer system of claim 6, the computer-executable instructions also including instructions that are executable to cause the computer system to delete the particular file based at least on the expiration time period having lapsed.

8. The computer system of claim 1, wherein the data that is associated with the particular file also defines at least one of (i) a signature identifying the data as pertaining to time-restricted access, (ii) a version of the data, and (ii) a locale from which the particular file originated.

9. A method, implemented at a computer system that includes one or more processors, for utilizing locale information when permitting or denying requested operations on a plurality of files stored at one or more storage devices, the method comprising:

receiving, over one or more network interfaces, a request from a remote computer system requesting performance of a requested operation on a particular file that is stored at one or more storage devices that are accessible to the computer system;

based at least on receiving the request, identifying a geographical locale of the remote computer system;

accessing data that is associated with the particular file, the data including one or more territory fields, each territory field being associated with a corresponding locale and including one or more operation fields, each operation field specifying (i) a corresponding type of operation that can be performed on the particular file by remote computer systems requesting the particular file from the corresponding locale and (ii) an operation expiry indicator defining a time period during which the corresponding operation can be performed;

based at least on accessing the data, identifying that the data includes a particular territory field that is associated with the identified geographical locale of the remote computer system;

permitting or denying performance of the requested operation on the particular file, including one of:

based at least on there being a particular operation field in the identified particular territory field that is associated with the requested operation, and based at least on a particular time period defined by a particular operation expiry indicator of the particular operation field having not expired, determining to permit performance of the requested operation on the particular file, and performing the requested operation on the particular file;

based at least on there being the particular operation field in the identified particular territory field that is associated with the requested operation, and based at least on the particular time period defined by the particular operation expiry indicator of the particular operation field having expired, determining to deny performance of the requested operation on the particular file; or based at least on there being no particular operation field in the identified particular territory field that is associated with the requested operation, determining to deny performance of the requested operation on the particular file; and sending, over the over the one or more network interfaces, a response to the remote computer system indicating whether the requested operation was permitted or denied.

10. The method of claim 9, wherein the data is stored at the one or more storage devices.

11. The method of claim 10, wherein the data is stored as an alternate data stream associated with the particular file.

12. The method of claim 10, wherein the data is stored as an extended property of the particular file.

13. The method of claim 9, wherein identifying the geographical locale of the remote computer system comprises identifying a locale that was specified in the request.

14. The method of claim 9, wherein the data that is associated with the particular file defines an expiration time period for the particular file.

15. The method of claim 14, further comprising deleting the particular file based at least on the expiration time period having lapsed.

16. The method of claim 9, wherein the data that is associated with the particular file also defines at least one of (i) a signature identifying the data as pertaining to time-restricted access, (ii) a version of the data, and (ii) a locale from which the particular file originated.

17. One or more computer readable devices having stored thereon computer-executable instructions that are executable by one or more processors of a computer system to cause the computer system to utilize locale information when permitting or denying requested operations on a plurality of files stored at one or more storage devices, the computer-executable instructions including instructions that are executable to cause the computer system to perform at least the following:

receive, over one or more network interfaces, a request from a remote computer system requesting performance of a requested operation on a particular file that is stored at one or more storage devices that are accessible to the computer system;

based at least on receiving the request, identify a geographical locale of the remote computer system;

access data that is associated with the particular file, the data including one or more territory fields, each territory field being associated with a corresponding locale and including one or more operation fields, each operation field specifying (i) a corresponding type of operation that can be performed on the particular file by remote computer systems requesting the particular file from the corresponding locale and (ii) an operation expiry indicator defining a time period during which the corresponding operation can be performed;

based at least on accessing the data, identify that the data includes a particular territory field that is associated with the identified geographical locale of the remote computer system;

permit or deny performance of the requested operation on the particular file, including one of:

based at least on there being a particular operation field in the identified particular territory field that is associated with the requested operation, and based at least on a particular time period defined by a particular operation expiry indicator of the particular operation field having not expired, determining to permit performance of the requested operation on the particular file, and performing the requested operation on the particular file;

based at least on there being the particular operation field in the identified particular territory field that is associated with the requested operation, and based at least on the particular time period defined by the particular operation expiry indicator of the particular operation field having expired, determining to deny performance of the requested operation on the particular file; or based at least on there being no particular operation field in the identified particular territory field that is associated with the requested operation, determining to deny performance of the requested operation on the particular file; and send, over the over the one or more network interfaces, a response to the remote computer system indicating whether the requested operation was permitted or denied.

18. The one or more computer readable devices of claim 17, wherein the data is stored as an alternate data stream associated with the particular file.

19. The one or more computer readable devices of claim 17, wherein the data is stored as an extended property of the particular file.

20. The one or more computer readable devices of claim 17, the computer-executable instructions also including instructions that are executable to cause the computer system to delete the particular file based at least on an expiration time period defined in the data having lapsed.

* * * * *